United States Patent
Lu et al.

(10) Patent No.: US 8,441,485 B2
(45) Date of Patent: May 14, 2013

(54) METHOD AND APPARATUS FOR GENERATING VIDEO ANIMATION

(75) Inventors: Yisha Lu, Shenzhen (CN); Xiaxiang Lin, Shenzhen (CN); Jianyu Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/152,923

(22) Filed: Jun. 3, 2011

(65) Prior Publication Data

US 2011/0227932 A1 Sep. 22, 2011

Related U.S. Application Data

(63) Continuation of application No. PCT/CN2009/075062, filed on Nov. 20, 2009.

(30) Foreign Application Priority Data

Dec. 3, 2008 (CN) .......................... 2008 1 0184517

(51) Int. Cl.
*G06T 13/00* (2011.01)

(52) U.S. Cl.
USPC ........... 345/473; 345/419; 345/427; 345/441; 345/474; 345/475; 345/536

(58) Field of Classification Search .................. 345/419, 345/427, 441, 536, 473–475
See application file for complete search history.

(56) References Cited

U.S. PATENT DOCUMENTS

| 6,097,381 | A | * | 8/2000 | Scott et al. | 715/203 |
|---|---|---|---|---|---|
| 6,232,965 | B1 | * | 5/2001 | Scott et al. | 715/203 |
| 6,462,742 | B1 | * | 10/2002 | Rose et al. | 345/473 |
| 6,504,546 | B1 | * | 1/2003 | Cosatto et al. | 345/473 |
| 6,919,892 | B1 | * | 7/2005 | Cheiky et al. | 345/473 |
| 7,027,054 | B1 | * | 4/2006 | Cheiky et al. | 345/473 |
| 2007/0159486 | A1 | | 7/2007 | Sasaki | |
| 2010/0007665 | A1 | * | 1/2010 | Smith et al. | 345/473 |

FOREIGN PATENT DOCUMENTS

| CN | 1710613 A | 12/2005 |
|---|---|---|
| CN | 101069214 A | 11/2007 |
| CN | 101311966 A | 11/2008 |
| CN | 101436312 A | 5/2009 |
| WO | WO-2007/081899 A3 | 10/2007 |
| WO | WO-2007/127743 A3 | 6/2008 |

OTHER PUBLICATIONS

DeCarlo et al. "Specifying and Animating Facial Signals for Discourse in Embodied Conversational Agents". Jul. 2003.*

(Continued)

*Primary Examiner* — Kimbinh T Nguyen
(74) *Attorney, Agent, or Firm* — Marshall, Gerstein & Borun LLP

(57) ABSTRACT

The examples of the present invention provide a method and apparatus for generating a video animation, and the method and apparatus relate to the animation field. The method includes: receiving a command sent by a user, determining an action corresponding to the command according to the command, and determining the total number of frames corresponding to the action and a motion coefficient of each frame; calculating an offset of each control point in each frame according to the motion coefficient of each frame, and generating a video animation according to the offset of each control point in each frame and the total number of frames. An apparatus for generating a video animation is also provided.

5 Claims, 2 Drawing Sheets

OTHER PUBLICATIONS

Chinese Office Action for Application No. 2008101845475, dated Apr. 8, 2010.
International Preliminary Report on Patentability for Application No. PCT/CN2010/075062, dated Jun. 7, 2011.
International Search Report and Written Opinion for Application No. PCT/CN2010/075063, dated Mar. 11, 2010.
Parke, "A Parametric Model for Human Faces," Dissertation submitted to University of Utah (1974).
Platt et al., "Animating Facial Expressions," Computer Graphics, 15(3):245-252 (1981).

* cited by examiner

METHOD AND APPARATUS FOR GENERATING VIDEO ANIMATION

CROSS-REFERENCE TO RELATED APPLICATIONS

This is a continuation of International Patent Application No. PCT/CN2009/075062 filed Nov. 20, 2009, which in turn claims the priority benefit of Chinese Patent Application No. CN 200810184517.5, filed Dec. 3, 2008, the entire respective disclosures of which are incorporated herein by reference.

FIELD OF THE INVENTION

The present invention relates to animation technologies, and more particularly to a method and apparatus for generating a video animation.

BACKGROUND OF THE INVENTION

Most Internet users enjoy self-presentation and showing personality, so as to receive attention from others. And thus, video animations are favored by more and more Internet users because of rich expression forms.

With the development of video animation technologies, the video animation technologies are directed to the combination of audio technologies and video technologies, and facial engine and driving technologies, especially, the facial engine and driving technologies are core technologies applied to video animations.

In order to provide a video animation, a conventional method for generating the video animation is provided. In the method, a grid model based on facial musculature is established, and a symbol system is established for the grid model. The symbol system implements expression coding by controlling the grid model, so as to generate the video animation.

During the implementation of the above conventional technical solution, the inventor finds following problems.

In the conventional technical solution, the video animation is generated by establishing the grid model and the symbol system, and the calculation amount of establishing the grid model and the symbol system is very large, thus the time of generating the video animation is long, and application scenes are limited.

SUMMARY OF THE INVENTION

Examples of the present invention provide a method and apparatus for generating a video animation, and in the method and apparatus, the calculation amount is small, the time of generating the video animation is short, and further the method and apparatus can be applied in a large application scope.

The examples of the present invention provide a method for generating a video animation, which includes:

receiving a command sent by a user, determining an action corresponding to the command, and determining the total number of frames corresponding to the action and a motion coefficient of each frame;

calculating an offset of each control point in each frame according to the motion coefficient of each frame, and generating a video animation according to the offset of each control point in each frame and the total number of frames.

The examples of the present invention also provide an apparatus for generating a video animation, which includes:

a receiving unit, configured to receive a command sent by a user;

a determining unit, configured to determine an action corresponding to the command according to the command, and determine the total number of frames corresponding to the action and a motion coefficient of each frame;

a calculating unit, configured to calculate an offset of each control point in each frame according to the motion coefficient of each frame; and a generating unit, configured to generate a video animation according to the offset of each control point in each frame and the total number of frames.

It can be seen from the above technical solutions provided by the examples of the present invention that, after the action and the motion coefficient corresponding to the action are determined according to the received command of the user, the offsets are calculated according to the motion coefficient, and the video animation is generated according to the offsets and the total number of frames. In the method, the video animation is generated without establishing a grid model and a symbol system, the calculation amount of generating the video animation according to the offsets and the total number of frames is small, the time of generating the video animation is short, and further the method can be applied in a large application scope.

DETAILED DESCRIPTION OF THE INVENTION

Figure 1:
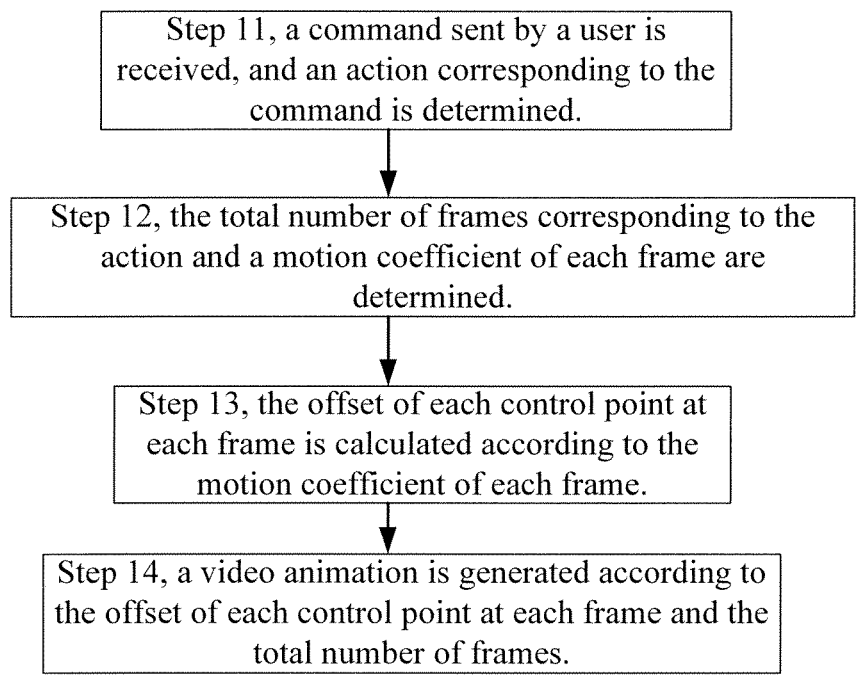
FIG. 1 is a flowchart illustrating a method for generating a video animation according to an example of the present invention.

An example of the present invention provides a method for generating a video animation. The method is shown in FIG. 1, and includes the following steps.

Step 11, a command sent by a user is received, and an action corresponding to the command is determined.

The command in this step may be an audio command sent by the user, or an command sent by the user through keys, e.g. inputting numeral "1" represents shaking head, and inputting numeral "2" represents nodding. The examples of the present invention do not limit the implementation of the command, as long as the command can be recognized. The command sent by the user in this step may be a command of a single action, or a combination command of multiple actions. When the command is the combination command of multiple actions, emotions of a person is presented according to the combination of the multiple actions, and the facial expression shown in the video animation is enriched.

Step 12, the total number of frames corresponding to the action and a motion coefficient of each frame are determined.

This step may be implemented through any one of the following methods.

Method A): the total number of frames corresponding to each action and the motion coefficient of each frame are predetermined, e.g., the total number of frames corresponding to an action of shaking head is predetermined as 10, and the motion coefficient of each frame is predetermined as 0.01×N. In actual applications the motion coefficients of different frames may be configured as different values, e.g., the motion coefficients of the former 5 frames are configured as 0.01×N, and the motion coefficients of the latter 5 frames are configured as 0.05+0.008×(N−5), where N is the serial number of frame. The parameters including 0.01 and 0.008 in the above motion coefficients may be configured by the user himself, and the examples of the present invention do not limit the values of the parameters.

Method B): the user directly configures the total number of frames corresponding to each action and the motion coefficient of each frame. Since the user configures the total number of frames corresponding to each action and the motion coefficient of each frame himself, the generated video animation can better present the personality of the user.

Step 13, the offset of each control point in each frame is calculated according to the motion coefficient of each frame.

The offset in this step may include an offset at a horizontal direction (X axis) and an offset at a vertical direction (Y axis).

The control points in the example are used to present the contour of facial apparatuses, such as head, eyes, and eyebrows etc, in other words, the control points are vertexes of the apparatuses. The control points and lines between the control points constitute a grid model.

In order to be convenient for description, the method for implementing this step may include configuring the motion coefficient of each apparatus in each action, e.g., the motion coefficient of eyes or eyebrows is m_eyeCoef, the motion coefficient of tilting head left and right is mangle (unit: radian), the motion coefficient of nodding head or shaking head is v_angle, and the horizontal and vertical motion coefficients of mouth are respectively horModelCoef and verModelCoef.

A specific calculation method is as follows.

The offset of eyes or eyebrows at the X axis (the horizontal direction) is $(A\_x-Src\_x) \times m\_eyeCoef$, and the offset of eyes or eyebrows at the Y axis (the vertical direction) is $(A\_y-Src\_y) \times m\_eyeCoef$. Here, $(A\_x, A\_y)$ is a coordinate of the crossing point between a plumb line and a datum line when the plumb line is drawn from an original coordinate of the control point to the datum line. When the action is an action of eyes, the datum line is a canthus link, and when the action is an action of eyebrows, the datum line is an axis line of the face. $(Src\_x, Src\_y)$ is the original coordinate of the control point, and the control point may be the vertex of the eyes or eyebrows when the grid model is used, the original coordinate is a coordinate of the control point in an original picture, and the original picture may be a picture inputted by the user or a preset picture, i.e., a picture before the video animation is generated.

The offset of tilting head left and right at the X axis (the horizontal direction) may be $(Src\_x-Pivot\_x) \times \cos(m\_angle)-(Src\_y-Pivot\_y) \times \sin(m\_angle)$, and offset of tilting head left and right at the Y axis (the vertical direction) may be $(Src\_x-Pivot\_x) \times \sin(m\_angle)+(Src\_y-Pivot\_y) \times \cos(m\_angle)$. Here, $(Src\_x, Src\_y)$ is the original coordinate of the control point, and $(Pivot\_x, Pivot\_y)$ is a coordinate of a fixed point. The fixed point is a crossing point between an axis line of the head and the lower outline of the head.

The offset of nodding or shaking head at the X axis may be $Src\_x+K\_i \times v\_angle \times V\_x$, and the offset of nodding or shaking head at the Y axis may be $Src\_y+K\_i \times v\_angle \times V\_y$. Here, $(Src\_x, Src\_y)$ is the original coordinate of the control point, where K_i is a rotation coefficient of nodding or shaking head, and $K\_i=Delta\_1/Dis\_1$. For the action of nodding head, Delta_1 represents motion amount at the Y axis (the vertical direction) when the head rotates for a fixed degree (e.g. 1 degree), and Dis_1 represents the maximum length of the head at the Y axis (the vertical direction). For the action of shaking head, Delta_1 represents motion amount at the X axis (the horizontal direction) when the head rotates for a fixed degree (e.g. 1 degree), and Dis_1 represents the maximum length of the head at the X axis (the horizontal direction). $(V\_x, V\_y)$ is a coordinate of a standard vector. For the action of nodding head, the standard vector is a vector from an upmost point of the head to a down most point of the head; for the action shaking head, the standard vector is a vector from a leftmost point of the head to a rightmost point of the head.

When the action is an action of the mouth, the offset of the mouth at the X axis may be mouthWidth×cos(m_horAngle)×horizonCoef×horModelCoef+mouthHeight×cos(m_verAngle)×verticeCoef×verModelCoef, and the offset of the mouth at the Y axis may be mouthWidth×sin(m_horAngle)×horizonCoef×horModelCoef+mouthHeight×sin(m_verAngle)×verticeCoef×verModelCoef.

Where, mouthWidth is a distance between the left corner of the mouth and the right corner of the mouth, mouthHeight is the height from an apex of an axis line of the upper lip to the bottom point of an axis line of the lower lip, m_verAngle is an angle between the axis line of the head and the X axis, m_horAngle is an angle between a line of corners of the mouth and the X axis, horizonCoef and verticeCoef are respectively horizontal and vertical motion extent coefficients of the mouth. The motion extent coefficients may be configured by the user or configured in advance.

Step 14, a video animation is generated according to the offset of each control point in each frame and the total number of frames.

This step may be implemented as follows.

A target coordinate of each control point in each frame is calculated according to the offset of each control point in each frame.

The method of implementing this step may include that: the target coordinate of each control point may be the coordinate of a datum point+the offset. For the action of eyes, eyebrows, mouth, nodding head or shaking head, the coordinate of the datum point is the original coordinate of the control point; for the action of tilting head left and right, the coordinate of the datum point is coordinate of a crossing point between the axis line of the face and the lower outline of the head.

Then, an image corresponding to each frame is generated according to the target coordinate of each control point in each frame, and the video animation is generated according to the image corresponding to each frame and the total number of frames.

In this step, the video animation may be generated according to the image corresponding to each frame and the total number of frames by using a common video compression method or other conventional methods. The specific method for generating the video animation according to the image corresponding to each frame and the total number of frames is not limited in the examples of the present invention.

In the above method, if the received command of the user is a command of multiple actions, the command is decomposed into commands of single actions, the offset of each control point in each frame corresponding to each single action is generated according to the commands of single actions, the offsets of each control point in the frames respectively corresponding to the single actions are superposed into the offset of each control point in one frame corresponding to multiple actions, and the video animation is generated according to the offset of each control point in the frame corresponding to the multiple actions. In the above method, the original picture of the video animation may be a self-defining picture inputted by the user, or a picture recommended to the user.

In actual applications, the expression may be determined according to the generated video animation including the combination action or a single action, e.g., when the video animation includes the actions of nodding and blinking, the expression may be pleased; when the video animation includes the actions of tilting head left and right or shaking head, the expression may be unpleased. The expression corresponding to the video animation including the combination action or the single action may be self-configured by the user, which is not limited in the examples of the present invention.

In the method provided by the examples of the present invention, after the action and the motion coefficient corresponding to the action are determined according to the received command of the user, the offsets are calculated according to the motion coefficient, and the video animation is generated according to the offsets and the total number of frames. In the method, since the video animation is generated without establishing a grid model and a symbol system, and the calculation amount of generating the video animation according to the offsets and the total number of frames is small, the time of generating the video animation is short, and further the method can be applied in a large application scope. Moreover, in the method, the command of multiple actions may be received, and a combination video animation of multiple video animations is generated according to the command, so the combination video animation of multiple actions may be obtained by combining the video animations of single actions to express the emotion of the user.

In order to better describe the method of the present invention, an example is provided to illustrate the specific method of the present invention.

Figure 2:
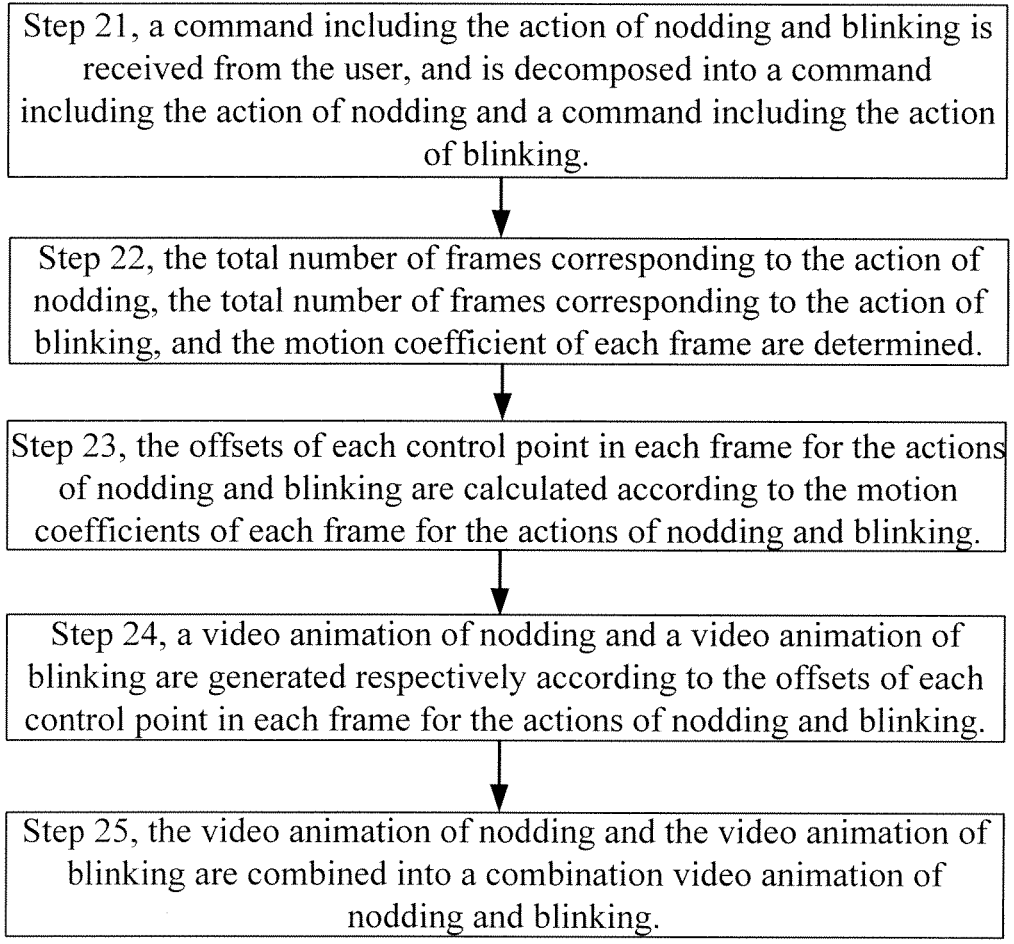
FIG. 2 is a flowchart illustrating a method for generating a video animation according to another example of the present invention.

An example provides a method for generating a video animation. In the example, an original picture of the video animation is a self-defining picture of the user. Suppose the original picture is a picture A and the command of the user includes an action of nodding and blinking at the same time, the method is shown in FIG. 2 and includes the following specific steps.

Step 21, the command including the action of nodding and blinking is received from the user, and is decomposed into a command including the action of nodding and a command including the action of blinking.

Step 22, the total number of frames corresponding to the action of nodding, the total number of frames corresponding to the action of blinking, and a motion coefficient of each frame are determined.

In this step, the method for determining the motion coefficient may refer to the description of the step 12.

Step 23, the offsets of each control point in each frame for the actions of nodding and blinking are calculated according to the motion coefficients of each frame for the actions of nodding and blinking.

In this step, the method for calculating the offsets may refer to the description of the step 13.

Step 24, a video animation of nodding and a video animation of blinking are generated respectively according to the offsets of each control point in each frame for the actions of nodding and blinking.

Step 25, the video animation of nodding and the video animation of blinking are combined into a combination video animation of nodding and blinking.

Preferably, in the example, it can be determined according to the combination video animation of nodding and blinking that the expression provided by the user is pleased.

In the example, after the command including the actions of nodding and blinking is received from the user, the command of multiple actions is decomposed into single commands, the offset of each control point in each frame for each action is calculated, the video animation of single action is generated according to the offset and the total number of frames, and the video animations of single actions are combined into the combination video animation of multiple actions. In the method, since the video animation is generated by calculating the offsets, the calculation amount is small, the time of generating the video animation is short, and further the method can be applied in a large application scope. Moreover, by using the method, the combination video animation of multiple actions can be generated, and the emotion of the user can be expressed by the combination of multiple actions, and the facial expression shown in the video animation is enriched.

Figure 3:
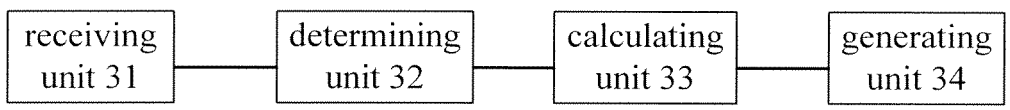
FIG. 3 is a schematic diagram illustrating the structure of an apparatus for generating a video animation according to an example of the present invention.

The examples of the present invention also provide an apparatus for generating a video animation, as shown in FIG. 3. The apparatus includes: a receiving unit 31 configured to receive a command sent by a user; a determining unit 32 configured to determine an action corresponding to the command and determine the total number of frames corresponding to the action and a motion coefficient of each frame; a calculating unit 33 configured to calculate an offset of each control point in each frame according to the motion coefficient of each frame; a generating unit 34, configured to generate a video animation according to the offset of each control point of each frame and the total number of frames.

Preferably, the determining unit 32 includes a user configuring module configured to configure the total number of frames corresponding to the action and the motion coefficient of each frame by the user; or
 a configuring module, configured to configure the total number of frames corresponding to the action and the motion coefficient of each frame in advance.

Preferably, if it is determined that the action is an action of eyes or eyebrows, the calculating unit 33 includes:
 an eye part calculating module configured to calculate the offset of each control point for the action of eyes or eyebrows, the calculating method of the offset may refer to the description of the method examples.

Preferably, if it is determined that the action is an action of tilting head left and right, the calculating unit 33 includes:
 a tilting head calculating module configured to calculate the offset of each control point for the action of tilting head left and right, and the calculating method of the offset may refer to the description of the method examples.

Preferably, if it is determined that the action is an action of nodding or shaking head, the calculating unit 33 includes: a head part calculating module configured to calculate the offset of each control point for the action of nodding or shaking head, and the calculating method of the offset may refer to the description of the method examples.

Preferably, if it is determined that the action is an action of mouth, the calculating unit 33 includes: a mouth calculating module configured to calculate the offset of each control point for the action of mouth, and the calculating method of the offset may refer to the description of the method examples.

Preferably, the generating unit 34 includes: a coordinate calculating module and a video generating module.

The coordinate calculating module is configured to calculate a target coordinate of each control point in each frame according to the offset of each control point in each frame. Specifically, the target coordinate of the control point is as follows:
- a target coordinate at the horizontal direction=a coordinate of a datum point at the horizontal direction+the offset at the horizontal direction;
- a target coordinate at the vertical direction=a coordinate of the datum point at the vertical direction+the offset at the vertical direction;
- the datum point may be a control point when the action is an action of eyes, eyebrows, nodding, shaking head or mouth; the datum point may be a crossing point of the axis line of the face and the lower outline of the head when the action is an action of tilting head left and right;
- the video generating module is configured to generate the video animation according to the target coordinate of each control point in each frame and the total number of frames.

In the apparatus provided by the examples of the present invention, after the receiving unit 31 receives the command of the user, the determining unit 32 determines the action and the motion coefficient corresponding to the action, the calculating unit 33 calculates the offsets according to the motion coefficient, and the generating unit 34 generates the video animation according to the offsets and the total number of frames. In the apparatus, since the video animation is generated without establishing a grid model and a symbol system, and the calculation amount of generating the video animation according to the offsets and the total number of frames is small, the time of generating the video animation is short and the apparatus can be applied in a large application scope.

Those skilled in the art may understand that all or part of steps of the method for implementing the examples may be implemented by instructing related hardware by a program, and the program may be stored in a readable storage medium of a computer. When the program is operated, the above method steps are included, and the storage medium includes a ROM/RAM, a disk, a Compact Disc (CD) and so on.

The method and apparatus provided by the examples of the present invention can be applied to video animations of mobile telephone or video animations of amusement webpage.

To sum up, by using the technical solutions provided by the examples of the present invention, the calculation amount is small, the time of generating the video animation is short, and further the technical solutions can be applied in a large application scope.

The foregoing are only preferred embodiments of the present invention and are not for use in limiting the protection scope of the present invention. Any modification, equivalent replacement and improvement made within the scope of the present invention should be covered under the protection scope of the present invention. Therefore, the protection scope of the present invention should be defined according to the claims.

The invention claimed is:

1. An apparatus for generating a video animation, comprising:
    a receiving unit, configured to receive a command sent by a user;
    a determining unit, configured to determine an action corresponding to the command according to the command, and determine the total number of frames corresponding to the action and a motion coefficient of each frame;
    a calculating unit, configured to calculate an offset of each control point in each frame according the motion coefficient of each frame; and
    a generating unit, configured to generate a video animation according to the offset of each control point in each frame and the total number of frames;
    wherein the action is a facial action, the control point is based on the contour of facial apparatuses, and the facial apparatus comprises at least one of eyes, eyebrows, mouth, and head;
    wherein the generating unit comprises,
    a coordinate calculating module, configured to calculate a target coordinate of each control point in each frame according to the offset of each control point in each frame, wherein the offset of the control point comprises an offset at a horizontal direction and an offset at a vertical direction, and the target coordinate of each control point is
    a target coordinate at a horizontal direction=a coordinate of a datum point at the horizontal direction+the offset at the horizontal direction,
    a target coordinate at a vertical direction=a coordinate of the datum point at the vertical direction+the offset at the vertical direction,
    when the action is an action of eyes, eyebrows, nodding head, shaking head or mouth, the datum point is the control point, when the action is an action of tilting head left and right, the datum point is a crossing point between an axis line of the head and a lower outline of the head,
    a video generating module, configured to generate the video animation according to the target coordinate of each control point in each frame and the total number of frames,
    wherein the action is the action of eyes or eyebrows, the calculating unit comprises,
    an eye part calculating module, configured to calculate an offset of eyes or eyebrows, wherein the offset at the horizontal direction=(A_x−Src_x)×m_eyeCoef, and the offset at the vertical direction=(A_y−Src_y)×m_eyeCoef,
    wherein (Src_x, Src_y) is an original coordinate of the control point, the original coordinate of the control point is a coordinate of the control point in an original picture obtained before the video animation is generated, wherein (A_x, A_y) is a coordinate of a crossing point between a plumb line and a datum line when the plumb line is drawn from the original coordinate of the control point to the datum line, when the action is the action of eyes, the datum line is a canthi link, and when the action is the action of eyebrows, the datum line is an axis line of the head; and wherein m_eyeCoef is the motion coefficient.

2. The apparatus of claim 1, wherein the determining unit comprises:
    a user configuring module, configured to configure the total number of frames corresponding to the action and the motion coefficient of each frame by the user, or
    a configuring module, configured to configure the total number of frames corresponding to the action and the motion coefficient of each frame in advance.

3. The apparatus of claim 1, wherein when the action is the action of tilting head left and right, the calculating unit comprises:
    a tilting head calculating module, configured to calculate the offset of tilting head left and right, wherein the offset at the horizontal direction=(Src_x−Pivot_x)×cos(m_angle)−(Src_y−Pivot_y)×sin(m_angle), and the offset at the vertical direction=(Src_x−Pivot_x)×sin(m_angle)+(Src_y−Pivot_y)×cos(m_angle); wherein (Src_x, Src_y) is an original coordinate of the control point, the original coordinate of the control point is a coordinate of the control point in an original picture obtained before the video animation is generated; (Pivot_x, Pivot_y) is a coordinate of the datum point; m_angle is the motion coefficient.

4. The apparatus of claim 1, wherein, when the action is the action of nodding or shaking head, the calculating unit comprises:

a head part calculating module, configured to calculate the offset of nodding or shaking head, wherein the offset at the horizontal direction=Src_x+K_i×v_angle×V_x, the offset at the vertical direction=Src_y+K_i×v_angle×V_y; wherein (Src_x, Src_y) is an original coordinate of the control point, the original coordinate of the control point is a coordinate of the control point in an original picture obtained before the video animation is generated; K_i=Delta_1/Dis_1, and (V_x, V_y) is a coordinate of a standard vector;

when the action is the action of nodding head, Delta_1 represents motion amount at the vertical direction when the head rotates for a fixed degree, Dis_1 represents maximum length of the head at the vertical direction, and the standard vector is a vector from an upmost point of the head to a downmost point of the head; when the action is the action of shaking head, Delta_1 represents motion amount at the horizontal direction when the head rotates for a fixed degree, Dis_1 represents maximum length of the head at the horizontal direction, and the standard vector is a vector from a leftmost point of the head to a rightmost point of the head; v_angle is the motion coefficient.

5. The apparatus of claim 1, wherein when the action is the action of mouth, the calculating unit comprises:

a mouth calculating module, configured to calculate the offset of mouth, wherein the offset at the horizontal direction=mouthWidth×cos(m_horAngle)×horizonCoef×horModelCoef+mouthHeight×cos(m_verAngle)×verticeCoef×verModelCoef, the offset at the vertical direction=mouthWidth×sin(m_horAngle)×horizonCoef×horModelCoef+mouthHeight×sin(m_verAngle)×verticeCoef×verModelCoef; wherein mouthWidth is a distance from a left corner of the mouth to a right corner of the mouth, mouthHeight is height from an apex of an axis line of an upper lip to a bottom point of an axis line of a lower lip, m_verAngle is an angle between an axis line of the head and the horizontal direction, m_horAngle is an angle between a line of canthi and the horizontal direction, horizonCoef and verticeCoef are respectively horizontal and vertical motion extent coefficients of the mouth, and horModelCoef and verModelCoef are respectively motion coefficients of the mouth at the horizontal and the vertical directions.

* * * * *